Feb. 5, 1963 J. C. CAVANAGH 3,076,708
PROCESS FOR THE PRODUCTION OF PROTEIN ENRICHED MATERIAL
FROM PROTEIN-CONTAINING MATERIALS HAVING
A RELATIVELY HIGH WATER CONTENT
Filed Nov. 6, 1959
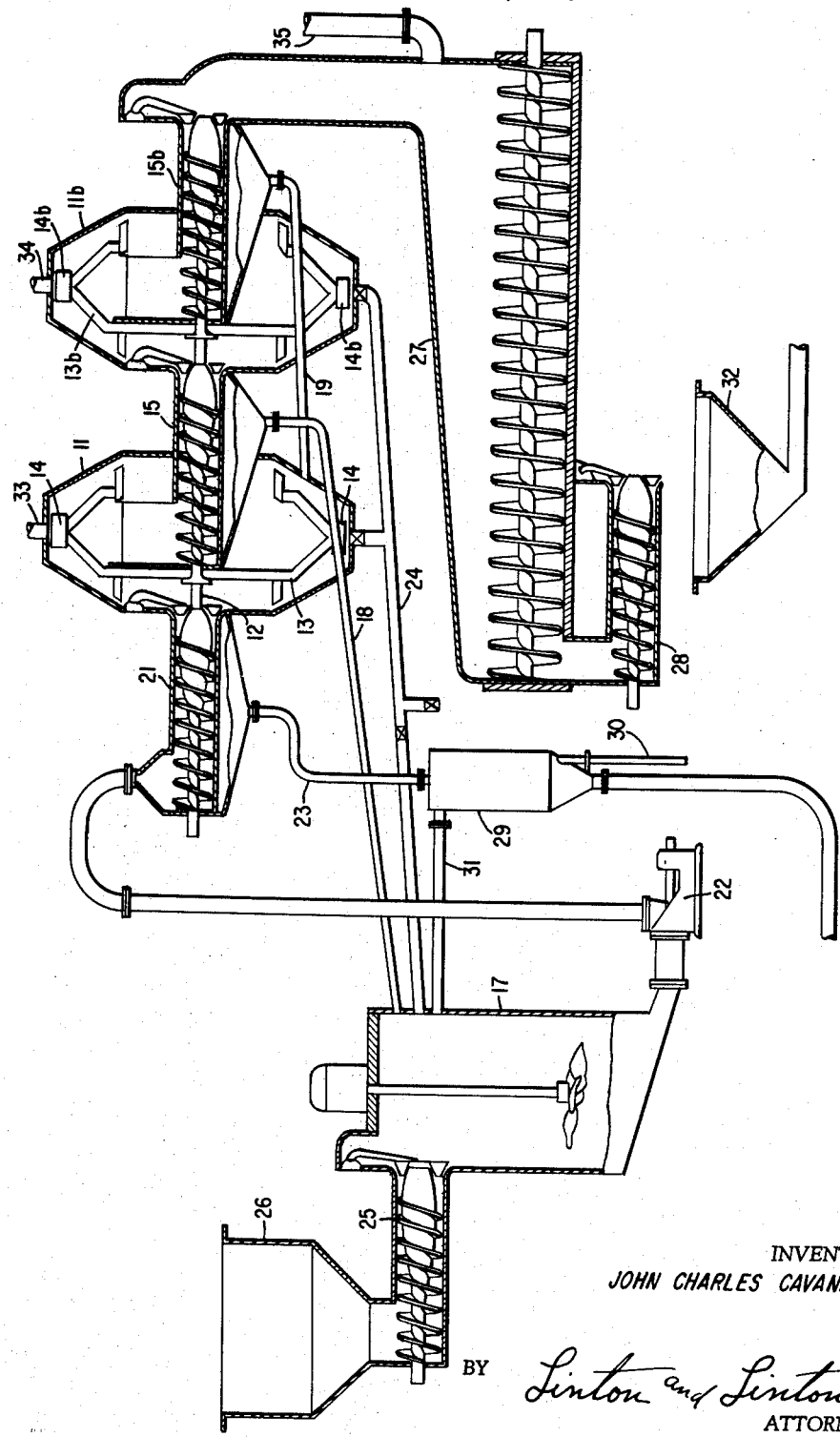
INVENTOR
JOHN CHARLES CAVANAGH
BY Linton and Linton
ATTORNEYS United States Patent Office 3,076,708
Patented Feb. 5, 1963

3,076,708
PROCESS FOR THE PRODUCTION OF PROTEIN ENRICHED MATERIAL FROM PROTEIN-CONTAINING MATERIALS HAVING A RELATIVELY HIGH WATER CONTENT
John Charles Cavanagh, Perth, Western Australia, Australia, assignor of one-half to Edwin George Inman, Perth, Western Australia, Australia
Filed Nov. 6, 1959, Ser. No. 851,344
Claims priority, application Australia Nov. 10, 1958
9 Claims. (Cl. 99—7)

This invention relates to a process for the production of protein enriched material from protein-containing materials having a relatively high water content.

With protein-containing materials such as the waste from abattoirs, fish processing plants and whaling stations, one of the major difficulties in recovering the protein material in a dried form, and separating the fat or oil, is the high water content of the raw material. The object of the present invention is to provide an improved process for the production of a protein-enriched product from protein-containing materials having a relatively high water content, i.e. of the order of 20% or greater.

In its broadest form the present invention resides in a process for producing a protein enriched product from protein-containing material having a water content of the order of 20% or greater which comprises subjecting the protein-containing material to a simultaneous dehydration and fat removal treatment with an organic solvent or mixture of solvents which is miscible with water and which has a boiling point below that of water.

The fat removal may be effected by carrying out the treatment at a temperature sufficient to effect rendering of the fat or by using sufficient solvent to ensure that the water and the fat are completely dissolved therein.

In some cases it may be desirable to carry out two successive treatments with the same or different solvents, the first to extract the water and remove by rendering a substantial amount of the fat, and the second to remove by dissolution the last of the fat.

If two separate solvents are used, the first is chosen as a dehydration solvent and is operated to mix with and leach out the water and simultaneously to remove a substantial amount of fat by rendering. This solvent and the entrained liquid fat are then drained or squeezed or otherwise separated from the solid product. The solid product, thus dehydrated and substantially reduced in fat content, is then further treated with a de-fatting solvent of a type which ordinarily dissolves fat. This solvent is then drained or squeezed or otherwise separated from the solid and the separated product is then freed from entrained de-fatting solvent by evaporation or desolventization. The dehydrating solvent and the de-fatting solvent must be chosen such that they are miscible with each other and that the two solvents can be recovered for re-use in their separated function without insurmountable difficulties in the way of close boiling points or azeotropic mixtures.

Thus in a further form the invention resides in a process for producing a protein enriched product from a protein-containing material which comprises subjecting the protein-containing material having a water content of the order of 20% or greater to a simultaneous dehydration and fat removal stage with a solvent which is miscible with water and has a boiling point below that of water, separating the material from the liquid phase, treating the separated material with a de-fatting solvent, and separating the dehydrated and defatted material from the de-fatting solvent. A wide range of organic solvents may be used. Suitable solvents include acetone, methanol, ethanol, azeotropic mixtures of solvents such as a mixture of acetone with methanol and methyl ethyl ketone, or trichlorethylene, methylene chloride, carbon tetrachloride, coal tar naphthas, isopropyl alcohol and aromatic hydrocarbons such as benzene.

The choice of solvent or solvents is governed by factors related to the basic characteristics of dehydration and fat rendering and of fat solubility, and also the use to which the products are to be subjected. If the products are to be used as feeding stuffs, freedom from injurious residues or taints is important.

Acetone has proved to be particularly suitable and is capable of fulfilling both functions, i.e. dehydration and fat rendering as well as de-fatting or fat solubilization. Hence, the one solvent virtually fulfills two functions. Furthermore, acetone has desirable characteristics in the matter of recovery by distillation for re-use. The reason for this is that there is a considerable difference between the boiling point of acetone and the boiling point of water, acetone boiling at 56.5° C. and water at 100° C. Furthermore, the acetone has a low specific heat and a low latent heat of vaporization and it does not form an azeotropic mixture with water.

In using acetone or other solvent which performs both functions, the process can be continuous although it can be regarded as being two successive stages. The reason for this is that the acetone, when it is mixed with substantial proportions of water in its dehydrating function, does not dissolve fat. However, in the second step, after dehydration is fairly complete and when the acetone is not substantially mixed with water, it is a very good fat solvent, being capable of dissolving up to 30% of fat at its boiling point.

If desirable, the two steps of dehydration and fat rendering and of de-fatting by fat solubilization may be operated entirely separately. Thus, after dehydration and fat rendering, the drained or squeezed or otherwise separated solid product may be freed from entrained dehydrating solvent by evaporation, resulting in a dried product from which a substantial amount of fat has already been removed. This dried product may then be treated with a de-fatting solvent to remove the last of the fat. As an example of this, a quantity of minced meat having a water content of the order of 60% was treated firstly with ethanol at temperature approximately 70° C. to dehydrate and to render out some of the fat. The product, after squeezing out the ethanol and entrained fat, was further freed from ethanol by evaporation. The resultant dried product contained 13% fat. A second treatment with a common hydrocarbon solvent known as X222 readily removed the last of the fat by ordinary solubilization. If this procedure is used, the choice of solvents is widened in so far as there is no necessity for the dehydrating and de-fatting solventsto possess any property of intermiscibility.

In carrying out the process, the protein-containing material is comminuted to a suitable particle size of the order of one-eighth to one-quarter of an inch and then treated with the solvent either in a batch process or in counter current flow, the apparatus being designed so that the solvent loss is reduced to a minimum. The temperature at which the first stage is carried out is not critical but should be such that a considerable portion of the fat is rendered or melted. For most purposes a temperature within the range of 40° C. to 60° C. is satisfactory. Preferably the process is carried out at a temperature lower than the boiling point of the solvent and higher than the melting point of the fat. After the treatment has been completed, the mixture is filtered, pressed, squeezed, centrifuged or otherwise treated to separate the solid material from the liquid phase. The liquid phase is passed to a distillation and/or fractionation unit for the recovery of solvent whilst the solid material is then further treated with the de-fatting solvent to dissolve the residual fat.

After treatment with the de-fatting solvent, the de-fatting solvent is then removed by filtering, pressing, squeezing or centrifuging and the drained or compressed solid material is then subjected to heat to evaporate the entrained solvent. If desired, the dried product may be further treated with steam to drive off the last traces of solvent and to introduce normal moisture. It is then comminuted to the desired degree. The outgoing extraction liquid, i.e. the liquid which has been separated from the product, comprises a mixture of one or more solvents, water and fat.

Because the solvent or solvents used are of types which boil at temperatures lower than that of water, the solvent is recovered for re-use by distillation or fractional distillation such that the solvent or solvents is condensed and the mixture of water and fat is left behind. The fat is then separated from the water by ordinary gravity separation into two layers or by centrifuging. If the solvent is acetone, the fat may also be readily separated by, if necessary, adding water to the mother liquor to bring the ratio of acetone to water to something of the order of 70% acetone to 30% water, in which mixture the fat is substantially insoluble. The fat can then be separated by chilling the liquor so that the fat solidifies, whereupon it can be separated by filtration. Alternatively the fats and oils can be separated from the mother liquor by centrifuging the liquor at a temperature above the melting point of the fat.

In certain cases of the raw material contains very excessive moisture, such as more than 60%, it may be desirable to reduce the moisture content of the raw material before subjecting it to the solvent treatment. This is best done by a pre-evaporation of portion of the water under reduced pressure at temperatures considerably lower than 100° C. The desirability or otherwise of a reduced pressure pre-evaporation treatment of the raw material is governed by factors related on the one hand to the coagulation or avoidance of coagulation of certain of the proteins in the protein-containing material, or on the other hand to the avoidance of damage by heat of the protein and other components such as vitamins in the protein-containing material.

A suitable moisture content after pre-evaporation and prior to solvent extraction is of the order of 25 to 45 percent by weight and preferably not greater than 60%. It has been found that if the raw material entering the solvent extracting process is excessively wet, the proportion of water in the solvent liquor withdrawn from the extraction phase of the process (hereinafter called the outgoing liquor) is high and this results in certain of the proteins going into solution or other proteins existing in an undesirable colloidal and soupy condition. This can be avoided by using a higher ratio of solvent to material being treated, thus reducing the proportion of water in the outgoing liquor. By using a higher solvent-raw material ratio, more solvent has to be recovered in relation to the amount of material treated, thereby involving larger recovery plant and higher costs of distillation, fractionation and condensation. The need for a larger recovery plant is eliminated if the raw material to be treated is subjected to a pre-evaporation so that part of the water is removed.

Whilst the pre-evaporation of part of the water is carried out by heating the material under reduced pressure, other methods may be used such as filtration but the evaporation under reduced pressure is to be preferred because filtration involves difficulties due to colloidal material in the product being treated.

Thus in another form the present invention resides in a process for producing a protein enriched product from a protein-containing material having a water content of the order of 20% or greater which comprises reducing the water content of the protein-containing material and thereafter subjecting the protein-containing material to a simultaneous dehydration and fat removal step with an organic solvent or mixture of solvents which is miscible with water and which has a boiling point below that of water.

Certain of the flavours or extracts in the protein-containing material may be extracted during the leaching process and remain in the outgoing liquor after removal of the fat and solvent and may be recovered therefrom. It is desirable during the removal or the recovery of the solvent from the outgoing liquor to carry out the distillation under reduced pressure to avoid any damage to the materials contained in the outgoing liquor. Such materials may include soluble proteins, vitamins and certain amino acids and amines which are soluble in a mixture of water and solvent. The degree of reduction in pressure is governed by the nature and amount of the proteins or other materials present in the outgoing liquor and whether or not they are to be recovered as by-products as separate commodities or to be incorporated with the protein material extracted from the raw material.

The process is applicable to the treatment of such materials as meat, fish, whale meat and oils, crayfish and similar protein-containing materials. The process is particularly applicable to the treatment of offal from meat works, whaling stations and like protein-containing materials. Because the time required for effective leaching is short (it is of the order of twenty minutes), the process is capable of a big throughput with a small plant. The capital cost of a plant necessary to carry out the process is relatively small and also as acetone costs approximately one-fifth as much as water to distil, it is considerably cheaper than existing processes for the removal of water from protein-containing materials even though the volume of acetone actually employed may be two or three times as great as the water content of the material.

The following specific examples will serve to exemplify the various features of the process:

Example 1

Three hundred grams of chopped bones and liver of moisture content approximately 60% were treated five times with acetone at approximately boiling point. The resultant protein product weighed 99 grams and appeared to have a very small fat content and could be ground easily. It had no apparent taint.

Example 2

Sixty-eight grams of chopped bones and liver of moisture content approximately 60% were treated in a counter flow process with acetone to provide approximately 20.5 grams of a protein-containing material which had a very small fat content and could be ground easily. It had no apparent taint.

Example 3

Mincemeat of moisture content approximately 60% was subjected to three extractions with a solvent comprising 30 parts ethyl alcohol, 20 parts methyl chloride and 10 parts of a hydrocarbon solvent known as Shell X4. The resultant product was well dehydrated and de-fatted and on drying showed no evidence of foreign taints. The mother liquor separated into two phases.

Example 4

Extraction of mincemeat of moisture content approximately 60% with a solvent comprising a mixture of 30 parts ethyl alcohol, 20 parts trichlorethylene and 10 parts of Shell X4 gave similar results to those in Example 3.

Example 5

Mincemeat of moisture content approximately 60% was subjected to two extractions with ethyl alcohol followed by two extractions with an azeotropic mixture of ethyl alcohol and trichlorethylene boiling at 70.8° C. The dehydration and de-fatting of the meat were satisfactory but the recovering of the solvents from the mother liquor was complicated.

Example 6

A mixture of 1471 grams of meat and bones of moisture content approximately 43% was treated in counter current flow with acetone in an amount of approximately 1120 gallons of acetone/ton of protein product recovered to produce 401 grams of a dehydrated protein product equivalent to 27.3% by weight and 260 gms. of fat equivalent to 17.7% by weight.

Example 7

Treatment of 847 gms. of whale meat of moisture content approximately 60% with five successive extractions with acetone yielded 242 gms. of a dried protein product containing relatively little fat or oil and having no foreign taint.

Example 8

This example is intended to indicate the effectiveness of the process in removing fat.

Five hundred gms. of beef kidney fat having a moisture content of 3.4% as determined by the Dean and Starke process were subjected to four successive treatments with acetone to yield 468 gms. of fat equivalent to 92.7% and 16.5 gms. of dried protein product equivalent to 3.3%.

Example 9

Sixty-nine gms. of crayfish tails and legs of moisture content approximately 62% were subjected to three successive treatments with acetone. The resultant product weighed 20.2 gms. equivalent to 29.2% recovery, was pale pink in colour with a faint odour of fish, and entirely free of the rank flavour and smell of crayfish meal produced by normal methods. The mother liquor contains the rank flavouring materials and the organge-red colouring matter.

Example 10

Two hundred gms. of rump steak of moisture content approximately 60% were subjected to four successive treatments with acetone. After the mother liquor had been separated from the solid product, it was diluted to approximately 70% acetone and 30% water and chilled to 11° C. The fat and other solids were filtered off and the filtrate which contained substantially no fat was distilled to recover the acetone. The mother liquor remaining after the distillation had the characteristic smell and taste of meat extract.

Example 11

Mincemeat of moisture content approximately 60% was subjected to counter flow treatment with acetone, the amount of acetone being equivalent to 1120 gallons/ton of dried protein product. After the protein product had absorbed equilibrium moisture it analyzed as follows:

| | Percent by weight |
|---|---|
| Protein | 88.7 |
| Fat | 1.04 |
| Ash | 2.26 |
| Moisture | 6.83 |
| Total | 98.83 |

Example 12

Ground beef bones of moisture content approximately 40% were subjected to a five stage counter flow treatment with acetone, the amount of acetone being equivalent to 1120 gallons/ton of product recovered. The product after taking up equilibrium moisture analyzed as follows:

| | Percent by weight |
|---|---|
| Protein | 54.30 |
| Fat | 3.95 |
| Ash and bone substance | 31.90 |
| Moisture | 6.38 |
| Total | 96.53 |

Example 13

Ground beef bones of moisture content approximately 45% were subjected to a seven stage counter flow treatment with acetone, the amount of acetone being equivalent to 1120 gallons/ton. The resultant product after taking up equilibrium moisture analyzed as follows:

| | Percent by weight |
|---|---|
| Protein | 54.10 |
| Fat | 1.64 |
| Ash and bone substance | 35.10 |
| Moisture | 5.73 |
| Total | 96.57 |

The products produced in all the above examples were stored in screw-tight jars at normal atmospheric temperature for periods of several months without any detectable signs of deterioration. The protein produced by the process of the present invention is relatively undamaged because it is not subjected to prolonged heating.

The apparatus for carrying out the process may be of conventional design although it is desirable to have special means for subjecting the comminuted material to extraction with the solvent. One suitable means is shown in the accompanying diagrammatic drawing showing a storage bin 26 for comminuted raw material with delivery screw 25 into a first stage dehydrating and rendering tank 17 followed by a screw press 21 and further followed by two extraction units connected in series. Each extraction unit comprises a container 11 provided with a central transverse substantially horizontal shaft 12 on which is mounted an agitator 13 and a series of buckets 14. A screw pass 15 is mounted so that it projects through one wall of the container, the screw being mounted on the shaft 12. The particulate material is withdrawn from the storage bin 26 and delivered by the sealed screw 25 into the first stage mixing and extractor tank 17 whilst fresh solvent is fed into the third stage extraction unit.

A body of solvent is maintained within each container and the particulate material is agitated with the solvent by the agitator 13 and small quantities of solvent and material are picked up by the buckets 14. When the buckets move towards the upper portion of their path, the contents are discharged into the inlet of the screw press 15. As the material passes through the press which has a perforated bottom, the excess solvent is expressed therefrom and returned to the first stage dehydrating and rendering tank 17 through line 18 where it is mixed with fresh material. The material is discharged from the screw press 15 into the container 11b of the second unit, where the operation is repeated. The liquid expressed from the material by the screw press 15b is returned to the first unit by means of line 19. The material is fed from the second unit by the screw press 15b into any suitable apparatus such as the desolventizer 27 where the solvent entrained therein is removed by evaporation. After the evaporated solvent has been condensed, it is returned to the solvent supply. Preferably the material is fed to the first unit by mixing it to a slurry with the solvent removed by the press 15 in the tank 17 and feeding it through line 20 to a screw press 21 by means of a pump 22. The screw press passes through the wall of the container 11. The solvent expressed by the screw press 21 is fed through line 23 to filter 29 to remove fine solid particulate material and then passes to distillation and fractionation equipment for recovery of the solvent and for subsequent separation and recovery of the fat. The filter 29 is cleaned by bringing fresh solvent in by line 30 for backwashing and allowing the backwash liquor to flow through line 31 to tank 17. Each of the containers is fitted with vents and fracture plates to prevent the build up of excess pressure within the containers and may be drained through pipe 24 back to tank 17 or otherwise to waste.

The rate of flow of the solvent and the material through the various units is regulated so that the solvent remains in contact with the material for a sufficiently long period to effect the maximum extraction.

Preferably the shaft on which the various rotating components are mounted is common to all units, although each unit may be provided with separate shafts if required.

The fact that the material is packed around the shaft as it passes through the screw press 15b ensures that the container is effectively sealed at the point between the outlet of the last screw press and the inlet to the de-solventizer.

The de-solventizer 27 is of a type such that the compressed material entering it from screw press 15b traverses from end to end by means of a rotating screw inside a shell. Heat is provided by means of a hot water or steam jacket around the shell and also by a flow of hot water or steam through the spiral part of the screw.

The dried, de-fatted material passing from the de-solventizer is taken by screw 28 and forced as a compact mass against a spring-loaded outlet such as to provide a seal against solvent vapour losses as the final treated product leaves the extraction process. The de-solventized material is stored in bin 32. The vapour from the extraction units 11 and 11b and the de-solventizer 27 is carried by pipes 33, 34 and 35 respectively to a stripping unit or the condenser of the distillation unit.

As one example of the performance of the process the treatment of comminuted animal bones in the aforementioned apparatus, using acetone in counterflow, will now be described:

(a) Firstly, to describe the passage of the solid material: The raw solid material enters the first extraction unit and the water contained in the raw material mixes with (or is leached out by) the acetone liquor. A great amount of the fat in the raw material is rendered out of the solid particles and is present in a rendered condition or as globules. After squeezing in the first press the solid mixes with the second quantity of acetone liquor in counterflow. In this stage, some of the fat may be in a rendered or globule form and some of it may be in true solution in the liquor, due to the smaller proportion of water in the acetone at this stage. After passage through the second press, the solid material enters the third quantity of acetone. At this stage, very little water is present in the acetone liquor and any remaining fat passes into true solution in the liquor. After passage through the third press, the solid material is freed almost entirely both of water and fat as it enters the de-solventizer for removal of the entrained acetone.

(b) Secondly, to describe the passage of the acetone in counterflow: Pure, recovered, acetone enters the third stage of the extraction, where it takes into solution any fat which has entered with the solid material coming through from stage 2. This liquid then passes through to stage 2, when the acetone mixes with some water and fat which have come through with the solid material from stage 1. Depending upon the extent of dilution of the acetone with water, some of the fat may be thrown out of solution and will be present in a rendered or globule form. The acetone liquor then passes into stage 1, in which the acetone is substantially diluted with the water contained in the incoming raw material. The dilution may be of the order 30% water by volume. At this dilution, the acetone does not appreciably dissolve fat and the fat coming in with the raw material as well as the fat coming back in the acetone counterflow are present in a rendered or globule form. This liquor then passes out of the extraction system for filtration and recovery of the acetone and separation of the fat.

It should be mentioned that the number of stages used in the process is dependent on various factors and is not specifically three. In certain instances one single stage or two stages may suffice, whilst, in others, four or more stages may be desirable.

Where used herein the term "fat" is intended to cover substances which are oils at normal temperatures as well as those fats which are solid at normal temperatures. It also embraces materials known as waxes.

I claim:

1. A process for producing a protein enriched product from a protein containing material having a water content of at least 20% consisting in reducing the water content of the protein containing material to below 60%, thereafter introducing the protein containing material into a flow of an organic solvent miscible with water and having a boiling point below that of water moving in counter direction to said material, agitating said material in progressive stages while in contact with said solvent, maintaining the temperature of the solvent and material while together during the process at a temperature lower than the boiling point of the solvent and higher than the melting point of the fat in the material and maintaining a sufficient volume of solvent in contact with the material to completely dissolve the water and fat in said material with the liquor containing the solvent and material separating into two phases, one containing substantially all the fat and the other containing substantially all the water.

2. A process as claimed in claim 1, wherein the solvent is acetone.

3. A process as claimed in claim 1, wherein the solvent is selected from the group consisting of methanol, ethanol, acetone, methyl ethyl ketone, trichlorethylene, methylene chloride, carbon tetrachloride, isopropyl alcohol and benzene.

4. A process for producing a protein enriched product from protein-containing materials having a water content of at least 20% and below 60% consisting in introducing the protein-containing material into a flow of an organic solvent miscible with water and having a boiling point below that of water moving in counter direction to said material, agitating said material in progressive stages while in contact with said solvent, maintaining the temperature of the solvent and material while together during the process at a temperature lower than the boiling point of the solvent and higher than the melting point of the fat in the material and maintaining a sufficient volume of solvent in contact with the material to completely dissolve the water in said material with the liquor containing the solvent and material separating into two phases, one containing substantially all the fat and the other containing substantially all the water.

5. A process as claimed in claim 4 where the solvent is acetone.

6. A process as claimed in claim 4 wherein the solvent is selected from the group consisting of methanol, ethanol, acetone, methyl ethyl ketone, trichlorethylene, methylene chloride, carbon tetrachloride, isopropyl alcohol and benzene.

7. A process for producing a protein enriched product from protein-containing materials having a water content of at least 20% and below 60% consisting in introducing the protein-containing material into a flow of an organic solvent miscible with water and having a boiling point below that of water moving in counter direction to said material, agitating said material in progressive stages while in contact with said solvent, maintaining the temperature of the solvent and material while together during the process at a temperature lower than the boiling point of the solvent and higher than the melting point of the fat in the material and maintaining a sufficient volume of solvent in contact with the material to completely dissolve the water and some of the fat in the material, separating the material from the liquor, and treating the separated material with a flow of a second organic solvent in sufficient quantity to remove substantially all the fat remaining in the material.

8. A process as claimed in claim 7 wherein the first organic solvent is acetone.

9. A process as claimed in claim 7 wherein the second organic solvent is a hydrocarbon solvent.

References Cited in the file of this patent
UNITED STATES PATENTS

| | | |
|---|---|---|
| 2,536,345 | Bradford | Jan. 2, 1951 |
| 2,619,425 | Levin | Nov. 25, 1952 |
| 2,875,061 | Vogel et al. | Feb. 24, 1959 |